(12) United States Patent
Salam

(10) Patent No.: US 10,257,072 B1
(45) Date of Patent: Apr. 9, 2019

(54) WEIGHT INITIALIZATION FOR RANDOM NEURAL NETWORK REINFORCEMENT LEARNING

(71) Applicant: Cisco Technology, Inc., San Jose, CA (US)

(72) Inventor: Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/718,901

(22) Filed: Sep. 28, 2017

(51) Int. Cl.
    *H04L 12/751*     (2013.01)
    *G06N 3/04*     (2006.01)
    *G06N 3/08*     (2006.01)

(52) U.S. Cl.
    CPC .............. *H04L 45/08* (2013.01); *G06N 3/049* (2013.01); *G06N 3/08* (2013.01)

(58) Field of Classification Search
    CPC ........... H04L 45/08; G06N 3/08; G06N 3/049
    See application file for complete search history.

(56) References Cited

U.S. PATENT DOCUMENTS

| 6,804,201 B1* | 10/2004 | Gelenbe .................. H04L 45/02 370/255 |
| 7,457,788 B2 | 11/2008 | Mishra |
| 9,929,933 B1* | 3/2018 | Viljoen ................... H04L 45/02 |
| 2003/0212645 A1 | 11/2003 | Schaffer et al. |
| 2011/0313961 A1* | 12/2011 | Toscano .................. H04L 45/08 706/14 |
| 2016/0162781 A1 | 6/2016 | Lillicrap et al. |
| 2017/0366398 A1* | 12/2017 | Mizrachi ............. H04L 41/0813 |
| 2018/0316595 A1* | 11/2018 | Jiang ....................... H04L 45/02 |

OTHER PUBLICATIONS

Erol Gelenbe, "The Random Neural Network & Some of it's Applications: Discovery or Inventions?", www.ee.imperial.ac.uk/gelenbe, Department of Electrical and Electronic Engineering, Imperial College, London SW7 2BT, Jun. 26, 2003, 94 pages.

(Continued)

*Primary Examiner* — Kwang B Yao
*Assistant Examiner* — Moo Jeong
(74) *Attorney, Agent, or Firm* — Edell, Shapiro & Finnan, LLC

(57) ABSTRACT

A plurality of paths through a network are determined for transmitting a packet from a source device to a destination device. The paths are modelled as nodes in a Random Neural Network, each node corresponding to a path and a reward is calculated for each of the nodes. An excitatory weight and an inhibitory weight are determined for each of the nodes in the Random Neural Network. The excitatory weight is set directly proportional to the reward corresponding to the node for which the excitatory weight is being determined, and the inhibitory weight is set inversely proportional to the reward corresponding to the node for which the inhibitory weight is being determined. A potential is determined for each of the nodes based upon the excitatory and inhibitory weights. A path corresponding to the node with the highest potential is selected, and the packet is transmitted over the selected path.

20 Claims, 9 Drawing Sheets

(56) References Cited

OTHER PUBLICATIONS

Erol Gelenbe, et al., "Cognitive Packet Networks: QoS and Performance", 10th IEEE International Symposium on Modeling, Analysis and Simulation of Computer and Telecommunications Systems, Mascots 2002, Oct. 16, 2002, Fort Worth, TX, 7 pages.

G. thimm, et al., "High Order and Multilayer Perception Initialization", IDIAP Technical Report, No. 94-07, Nov. 1994, IEEE Transactions on Neural Networks, vol. 8, Issue 2, Mar. 1997, 16 pages.

* cited by examiner

WEIGHT INITIALIZATION FOR RANDOM NEURAL NETWORK REINFORCEMENT LEARNING

TECHNICAL FIELD

The present disclosure relates to Random Neural Networks and using Random Neural Network techniques for path selection in network routing.

BACKGROUND

Optimal route/path selection in Software Defined Networks, including Software Defined Wide Area Networks (SD-WAN), may be based on network performance metrics, such as delay, jitter, packet loss ratios, bandwidth, and others. Systems for providing route selection rely on performance management probes and local Key Performance Indicators (KPIs) to make path selection decisions based on a preset policy that compares Service Level Agreement (SLA) data and KPIs against predefined thresholds and watermarks.

Machine learning provides an alternate approach for optimal route selection. Machine learning optimal route selection involves building a predictive model for the routing logic that is capable of optimizing the path selection process without relying on complex policies and pre-configured thresholds. The machine learning logic monitors the performance metrics and local KPIs to refine its predictions as it learns.

DESCRIPTION OF EXAMPLE EMBODIMENTS

Overview

In one example, a plurality of paths through a network are determined for transmitting a packet from a source device to a destination device. The paths are modelled as nodes in a Random Neural Network, each node corresponding to a path and a reward is calculated for each of the nodes. An excitatory weight and an inhibitory weight are determined for each of the nodes in the Random Neural Network. The excitatory weight is set directly proportional to the reward corresponding to the node for which the excitatory weight is being determined, and the inhibitory weight is set inversely proportional to the reward corresponding to the node for which the inhibitory weight is being determined. A potential is determined for each of the nodes based upon the excitatory and inhibitory weights. A path corresponding to the node with a highest potential is selected, and the packet is transmitted over the selected path.

Example Embodiments

Figure 1:
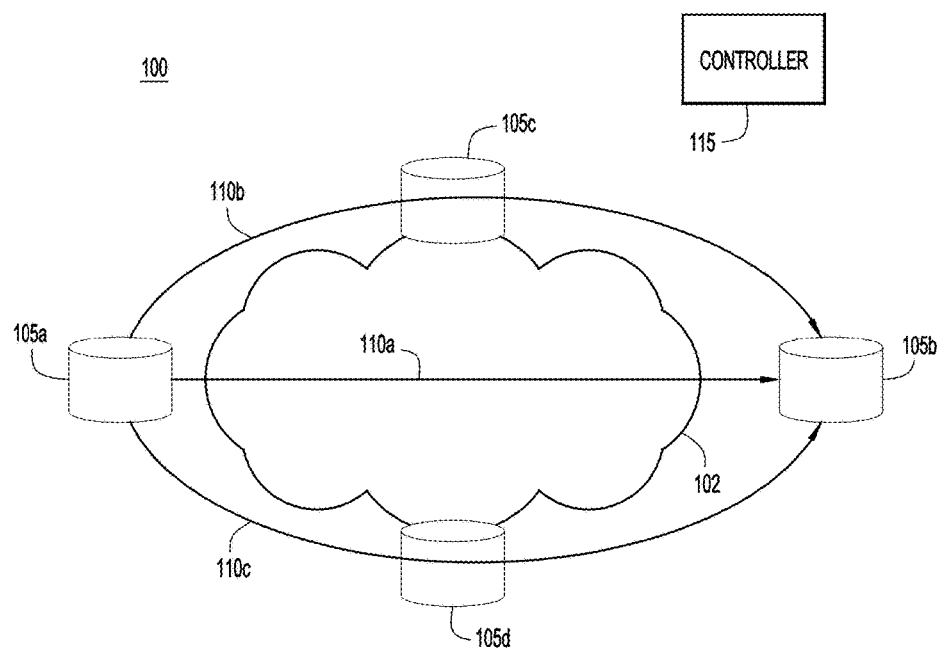
FIG. 1 illustrates a first network environment providing weight initialization for use with Random Neural Network modeling and Reinforcement Learning, according to an example embodiment.

With reference made to FIG. 1, depicted therein is a network environment 100 configured to provide network routing functions using Reinforcement Learning using the weight initialization techniques described herein. As illustrated, four network connected devices 105a-d are arranged within environment 100. For a packet being sent from network connected device 105a to network connected device 105b through network 102, there are three possible paths for the packet: a path 110a that goes directly from node 105a to node 105b, a path 110b that utilizes intervening node 105c, and a path 110c that utilizes intervening node 105d. In order to select between these three possible paths 110a-c, the selection of the paths may be modelled as a Random Neural Network (RNN) that utilizes Reinforcement Learning. This modelling may be performed by a centralized controller, such as Software Defined Network (SDN) controller 115 or at source network connected device 105a. When the modelling is performed at network connected device 105a, SDN controller 115 may provide information to network connected device 105a, such as network parameters and/or network performance details, which may be used by network connected device 105a in performing the modelling.

According to the techniques described herein, an RNN is constructed per source node/destination node pair. The RNN is a mathematical model inspired from biology and represented as a directed graph. The directed graph includes nodes which represent the possible paths between the source node and destination node. The nodes are interconnected via links to form the neural network. Each link has a pair of weights associated with it: positive (excitatory) weight, and negative (inhibitory) weight. These weights control the potential of every node through a system of non-linear equations. The potential of the node, in the context of the present disclosure, represents the probability that the corresponding path is the best-path for the purpose of route selection.

Figure 2:
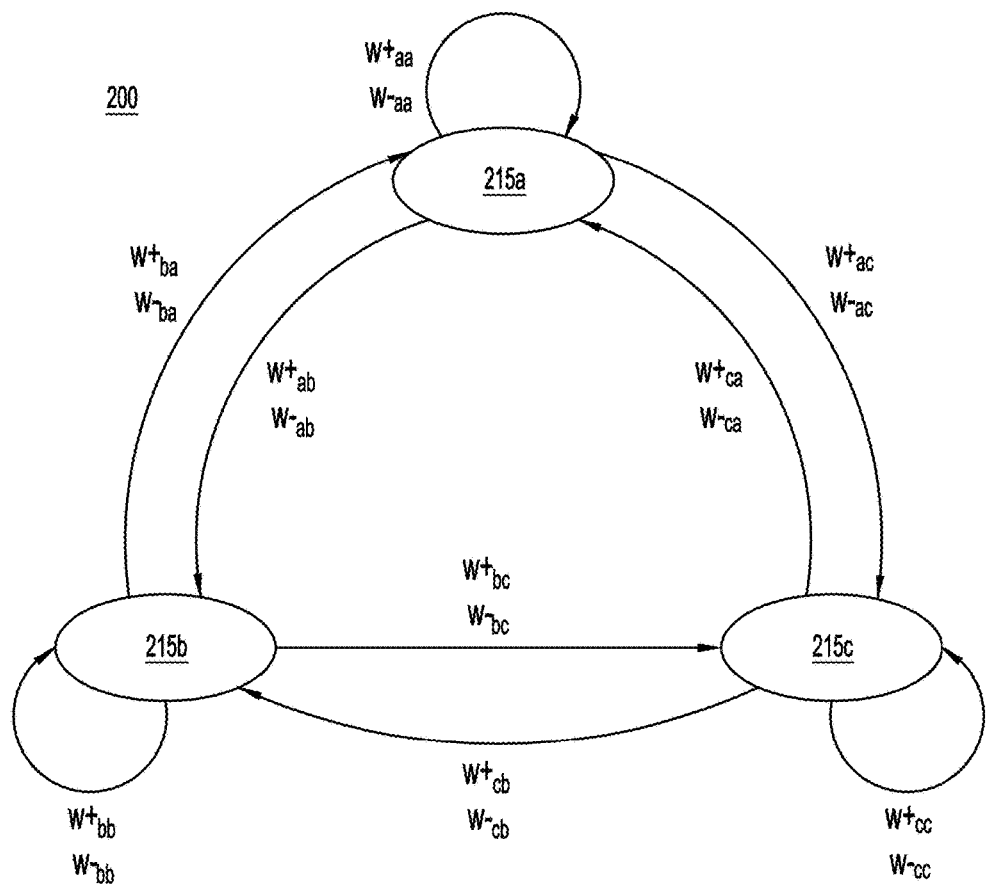
FIG. 2 illustrates a directed graph utilized in providing weight initialization for use with Random Neural Network modeling and Reinforcement Learning, according to an example embodiment.

Illustrated in FIG. 2 is an example RNN 200 that takes the form of a directed graph and corresponds to the network paths illustrated in FIG. 1. Node 215a corresponds to path 115a from FIG. 1, node 215b corresponds to path 115b from FIG. 1, and node 215c corresponds to path 115c from FIG. 1. The connections between the nodes include weights, excitatory weights "w+" and inhibitory weights "w−". When modelled as an RNN, it is assumed that each node receives "excitation spikes" and "inhibition spikes" from the nodes to which it is connected, as this is how neurons operate in a neural network. The weights represent the rates at which these spikes are sent from one node to another. Accordingly, weight "$w_{ba}^+$" represents the rate at which node 215b sends "excitation spikes" to node 215a when node 215b is "firing" and weight "$w_{ba}^-$" represents the rate at which node 215b sends "inhibition spikes" to node 215a when node 215b is "firing." Similarly, weight "$w_{ab}^+$" represents the rate at which node 215a sends "excitation spikes" back to node 215b and weight "$w_{ab}^-$" represents the rate at which node 215a sends "inhibition spikes" back to node 215b. The probability or potential of a particular node "firing" (which in this case will represent the selection of the path associated with the node) is determined by summing all of the incoming excitatory weights to the node, summing all of the incoming inhibitory weights to the node, and comparing these relative values. The node with the highest potential would then be selected as the path to handle the packet to be sent.

According to certain example embodiments of RNN models, the potential q for a node i may be calculated according to the following equations:

$$q_i = \lambda^+(i)/[r(i)+\lambda^-(i)] \quad (1)$$

where $$\lambda^+(i) = \Sigma_j q_j w_{ji}^+ + \nabla_i, \; \lambda^-(i) = \Sigma_j q_j w_{ji}^- + \lambda_i, \quad (2)$$

and $\nabla_i$ and $\lambda_i$ are constant parameters for the node i.

If node 215a is determined to have the highest potential, path 110a of FIG. 1 would be selected to transmit the packet. If node 215b is determined to have the highest potential, path 110b of FIG. 1 would be selected to transmit the packet. If node 215c is determined to have the highest potential, path 110c of FIG. 1 would be selected to transmit the packet.

In a Reinforcement Learning strategy, the results of sending the packet over a particular node are used to adjust the weights. As the weights are adjusted over time, the directed graph begins to select the optimal node for each packet. More specifically, an objective or goal is defined that should be met for transmission of a packet. This goal may be, for example, the selection of a path that meets a particular bandwidth, latency, shortest path, jitter or other network parameter value. If the path selected by the directed graph satisfies the objective, the node associated with the path is "rewarded" for its correct prediction by increasing the excitatory weights of links leading to the node, and reducing the inhibitory weights of those same links. On the other hand, if the selected path misses the objective, then it is "punished" by decreasing the excitatory weights and increasing the inhibitory weights of links leading to the node corresponding to the path in the directed graph. For example, the weights associated with the node may be readjusted as follows if the selected path met the object or goal:

$$w^+(i, j) = w^+(i, j) + \frac{R(t)}{T(t)}, \quad (3)$$

$$w^-(i, j) = w^-(i, j) + \frac{R(t)}{T(t)*(N-1)}, \quad (4)$$

where T is the decision threshold (e.g., an exponential average of the desired latency value, bandwidth value, jitter value, shortest path, etc.) at time t, R(t) is a measured reward value at the time t, and N is the total number of nodes in the directed graph.

The weights associated with the selected node may be readjusted as follows if the selected path did not meet the object or goal:

$$w^+(i, j) = w^+(i, j) + \frac{R(t)}{T(t)*(N-1)}, \quad (5)$$

$$w^-(i, j) = w^-(i, j) + \frac{R(t)}{T(t)} \quad (6)$$

The decision threshold T(t) discussed above is calculated based on an exponential average of past observations of the reward value:

$$T(t+1) = F*T(t) + (1-F)*R(t) \quad (7)$$

where T(t) is the decision threshold at time t, R(t) is the measured reward value at time t and F is a forgetfulness coefficient ranging between 0 and 1. A larger value of F means that more importance will be given to more recent observations.

A path is deemed to have met the object or goal when $R(t) \geq T(t)$, and to have not met the object or goal when $R(t) < T(t)$. As illustrated above, when the path meets the goal, the excitation weights to the node are increased and inhibitory weights to the node are decreased, thereby making it more likely that the path associated with the node will be selected again in the future. On the other hand, if the path does not meet the goal, the excitation weights to the node are decreased and the inhibitory weights to the node are increased, thereby making it less likely that the path associated with the node will be selected again in the future. Specifically, for a second packet to be sent from node 105a of FIG. 1 to node 105b of FIG. 1, the potentials for nodes 215a-c of directed graph 200 of FIG. 2 will be recalculated. Due to the adjustment of the weights as described above, it may be more or less likely that the same node will be selected again. As this process proceeds through a serious of iterations, the path selection provided by directed graph 200 of FIG. 2 will approach an optimal solution.

Absent from the discussion above was an indication of how the initial values for the weights "$w^+$" and "$w^+$" are selected. The problem of weight initialization for neural networks has been studied extensively, especially for RNNs that use supervised learning. Related art techniques utilize two classes of initialization techniques: (1) random initialization and (2) initialization based on statistical analysis of data.

Random initialization is widely accepted in the industry to yield acceptable convergence time. In this approach, the initial weights are selected randomly based on some distribution function (uniform, normal, Gaussian, Xavier, etc.) that takes into account the number of stages and fan-out of nodes in the directed graph. Selecting static constant values for the initial weights is a degenerate case of this technique.

Statistical initialization only works with supervised learning. It involves running the data through a statistical or geometric analysis to find optimal values for the initial weights. It is criticized for its complexity and for being time-consuming. Of course, a prerequisite is the availability of training data sets.

The techniques of the present disclosure utilize a strategy to initialize the link weights so as to jump-start the learning algorithm in a state that approximates as much as possible the converged state. The techniques described herein also set up the initial probability distribution of the nodes in the RNN such that the node with the highest reward ends up with the highest initial probability (i.e. potential), the node with the lowest reward ends up with the lowest initial potential, and the node whose rewards are in between have proportionally distributed potentials in between the two bounds.

By way of background, the potential of a node at a given time t is directly proportional to the sum of excitatory weights at time t and inversely proportional to the sum of inhibitory weights at time t. Accordingly, the techniques described herein provide initial link weight assignments such that the excitatory weights are directly proportional to the node's reward, whereas the inhibitory weights are inversely proportional to the reward. The techniques described herein may also satisfy the constraint that the sum of initial inhibitory weights should not be equal to zero, otherwise the system of non-linear equations to solve the potential values of the nodes will not converge. The above technique yields a family of equations that can be used to initialize the link weights, which follow the aforementioned strategy and meet the constraint.

The following example embodiment applies the techniques of the present disclosure to a directed graph which attempts to minimize path latency. It is to be understood that other routing objectives may be accommodated with no change to the proposed solution, or minor changes which base the reward on the network parameter to be optimized. In attempting to optimize latency, a node's reward is calculated as 1/latency. More specifically, as noted above, the reward is generally made directly proportional to the parameter being optimized. Here, the goal is to minimize latency, meaning the parameter being optimized is the inverse of latency. Similarly, for a parameter like jitter in which one would attempt to minimize jitter, the reward would be calculated as 1/jitter. For a different parameter, such as bandwidth, for which optimization would represent a maximum value of the parameter, the reward would be set directly proportional to the parameter.

In order to implement the techniques described herein, the following operations may be performed:
 1. The excitatory weights may be initialized to be directly proportional to the node's reward,
 2. The inhibitory weights may be initialized to be inversely proportional to the reward.
 3. The sum of initial inhibitory weights should not be equal to zero otherwise the system of non-linear equations to solve the potential values of the nodes will not converge.

Implementing the above operations allows for a family of equations that may be used to initialize the link weights. Implementing the above may result in the following specific example embodiment of the techniques described herein:
 The value of the initial latency associated with every candidate path is measured.
 The initial reward for every node is calculated based upon the calculated latency for each path.
 The value of the highest initial reward (i.e. least latency among candidate paths) is determined.
 The link weights of the nodes in the RNN are initialized per the two equations below:

$$w_{ab}^+ = R_b + 1 \quad (8)$$

$$w_{ab}^- = (R_{max} - R_b)/R_{max} + 1 \quad (9)$$

where $w_{ab}^+$ is the excitatory link weight from node a to node b, $w_{ab}^-$ is the inhibitory link weight from node a to node b, $R_b$ is the initial reward of node b, and $R_{max}$ is the maximum initial reward value among all nodes. When the weights are applied according to the equations above, it was found that the RNN's overall prediction accuracy increased from 88% to 92% compare to an equivalent network whose initial weights were randomly assigned. The volume of incorrect change predictions (i.e. the best path changes in the network, but the RNN is not able to predict the change correctly) improved by 38%. The volume of correct change predictions (i.e. the best path changes in the network and the RNN correctly predicts the change) increased by 160%.

The reward parameter R in the weight initialization/update functions may be mapped to any networking metric, such as jitter, packet loss ratio, latency, available bandwidth, path length, or any other metric as long as the metric in question exhibits over time the statistical properties of an anti-persistent stochastic process. In fact, the weight initialization techniques described herein may be applied to any RNN modeling of anti-persistent stochastic processes. Other such anti-persistent stochastic processes that may be modeled using RNN techniques and initialized according to the techniques described herein may include:
 Brain imaging segmentation techniques;
 Still image compression techniques;
 Adaptive video compression techniques; and
 Learning and reproduction of color techniques, among others.

Figure 3:
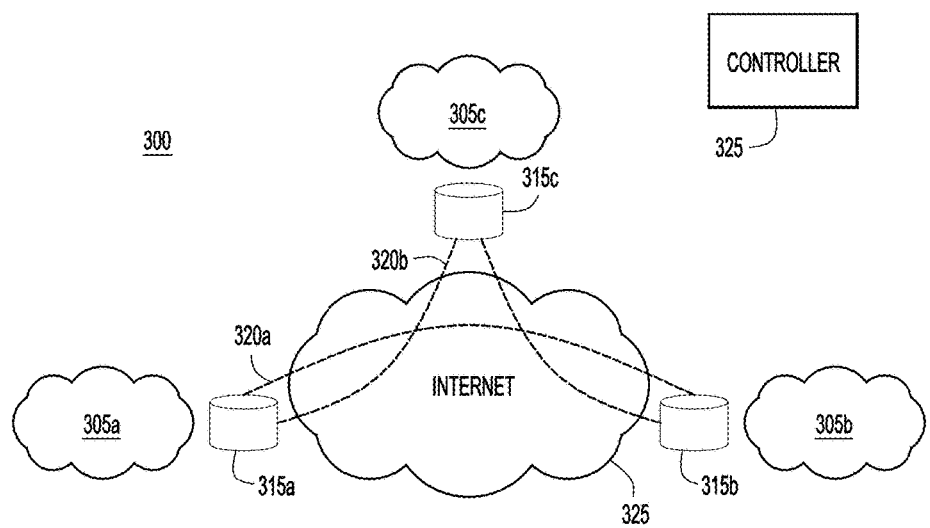
FIG. 3 illustrates a second network environment providing weight initialization for use with Random Neural Network modeling and Reinforcement Learning, according to an example embodiment.

With reference now made to FIG. 3, depicted therein is an example network environment 300 to which the techniques described herein may be particularly applicable. As illustrated in FIG. 3, network environment 300 is a Software Defined Wide Area Network (SD-WAN) that utilizes logical overlays that allow disparate physical networks 305a-c to be treated as a single logical network. Network connected devices 315a-c are edge nodes at each of physical networks 305a-c, respectively. Due to the presence of the logical overlay, there are two options for sending traffic between source network connected device 315a and destination network connected device 315b: path 320a which directly connects network connected device 315a to network connected device 315b via the Internet 330 without using the logical overlay network; and path 320b which connects to network connected device 315b via network connected device 315c using the logical overlay network. Because the selection and utilization of two such network paths may be modeled as an anti-persistent stochastic process, the techniques described herein may be particularly applicable to such a network environment. Specifically, for the combination of source network connected device 315a and destination network connected device 315b a directed graph may be constructed, such as directed graph 200 of FIG. 2. Though, because network environment 300 includes two possible paths between network connected devices 315a and 315b, the resulting directed graph will have two nodes as opposed to the three nodes of directed graph 200 of FIG. 2.

If latency is being optimized, the value of the initial latency associated with each of paths 320a and 320b is measured. An initial reward for every node in the directed graph is calculated based upon the calculated latency for each of paths 320a and 320b. The value of the highest initial reward (i.e. least latency among candidate paths) is determined and the link weights of the nodes in the directed graph are initialized such that the following conditions are met:
 1. The excitatory weights are initialized to be directly proportional to the node's reward,
 2. The inhibitory weights are initialized to be inversely proportional to the node's reward, and 3. The sum of initial inhibitory weights should not be equal to zero otherwise the system of non-linear equations to solve the potential values of the nodes will not converge.

Reinforcement Learning may then be performed to optimize the weights and path selection provided by the directed graph. These operations may take place at controller 325, or they may take place at network connected device 315a so long as network connected device 315a is provided with network parameter data that permits network connected device 315a to generate the directed graph and initialize the weight values as described above. This network parameter data may be provided to network connected device 315a by controller 325.

Figure 4:
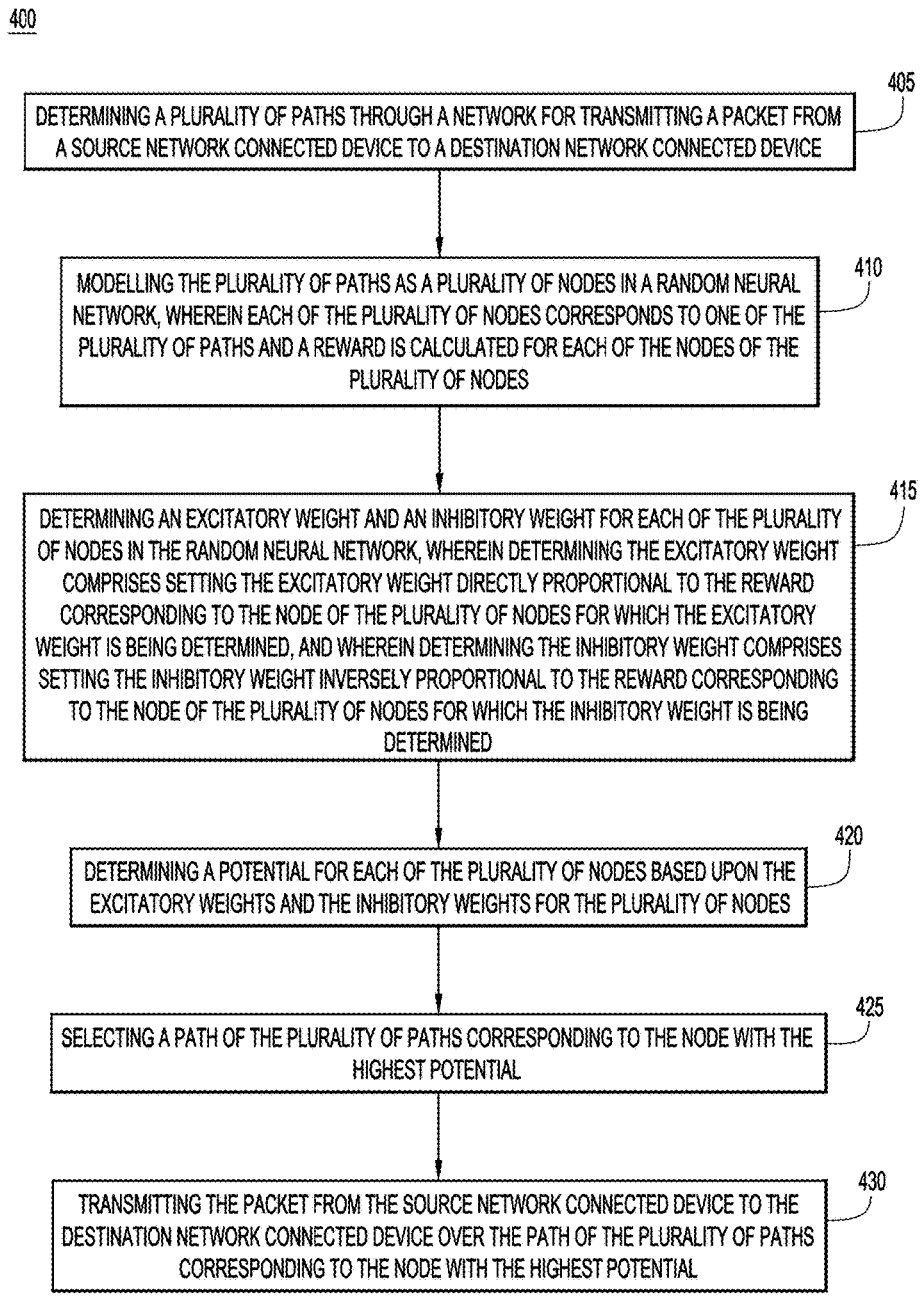
FIG. 4 illustrates a flowchart illustrating a process for providing weight initialization for use with Random Neural Network modeling and Reinforcement Learning, according to an example embodiment.

With reference now made to FIG. 4, depicted therein is a flowchart illustrating a process 400 for performing the techniques described herein. Process begins at operation 405 in which a plurality of paths through a network are determined. This plurality of paths are for transmitting a packet from a source network connected device to a destination network connected device. For example, operation 405 may determine that paths 110a-c represent the possible paths between network connected devices 105a and 105b from FIG. 1, or operation 405 may determine that paths 320a and 320b represent the possible paths between network connected devices 315a and 315b from FIG. 3.

In operation 410, the plurality of paths are modeled as a plurality of nodes in a Random Neural Network. Each node in the Random Neural Network corresponds to one of the plurality of paths determined in operation 405, and a reward is calculated for each node in the Random Neural Network. In other words, the plurality of paths may be modeled using an RNN modeling technique, such as those used to model network environment 100 of FIG. 1 as directed graph 200 of FIG. 2. In operation 415, an excitatory weight and an inhibitory weight in the Random Neural Network are determined. According to the example embodiment of FIG. 4, the weights are determined for each of the plurality of nodes in the Random Neural Network. Determining the excitatory weights comprises setting the excitatory weights directly proportional to the reward corresponding to the node of the plurality of nodes for which the excitatory weight is being determined, and determining the inhibitory weights comprises setting the inhibitory weights inversely proportional to reward for the node of the plurality of nodes for which the inhibitory weight is being determined. The determined excitatory weights and inhibitory weights may be the initial excitatory weights and inhibitory weights assigned to the nodes of the RNN model. Using the discussion above regarding latency, the RNN of process 400 may seek to optimize latency. Accordingly, the reward calculated for each node in operation 410 would be based on the latency of the path associated with the node. Specifically, the reward would be calculated as being directly proportional to 1/latency. Accordingly, the excitatory weights are set to be directly proportional to the reward (i.e., directly proportional to 1/latency), and the inhibitory weights are set to be inversely proportional to the reward (i.e., inversely proportional to 1/latency).

In operation 420 a potential for each of the plurality of nodes is determined based upon the excitatory weights and inhibitory weights for the plurality of nodes, and in operation 425 a path through the network corresponding to the node with a highest potential is selected. Finally, in operation 430, the packet is transmitted over the path corresponding to the node with the highest potential.

Figure 5:
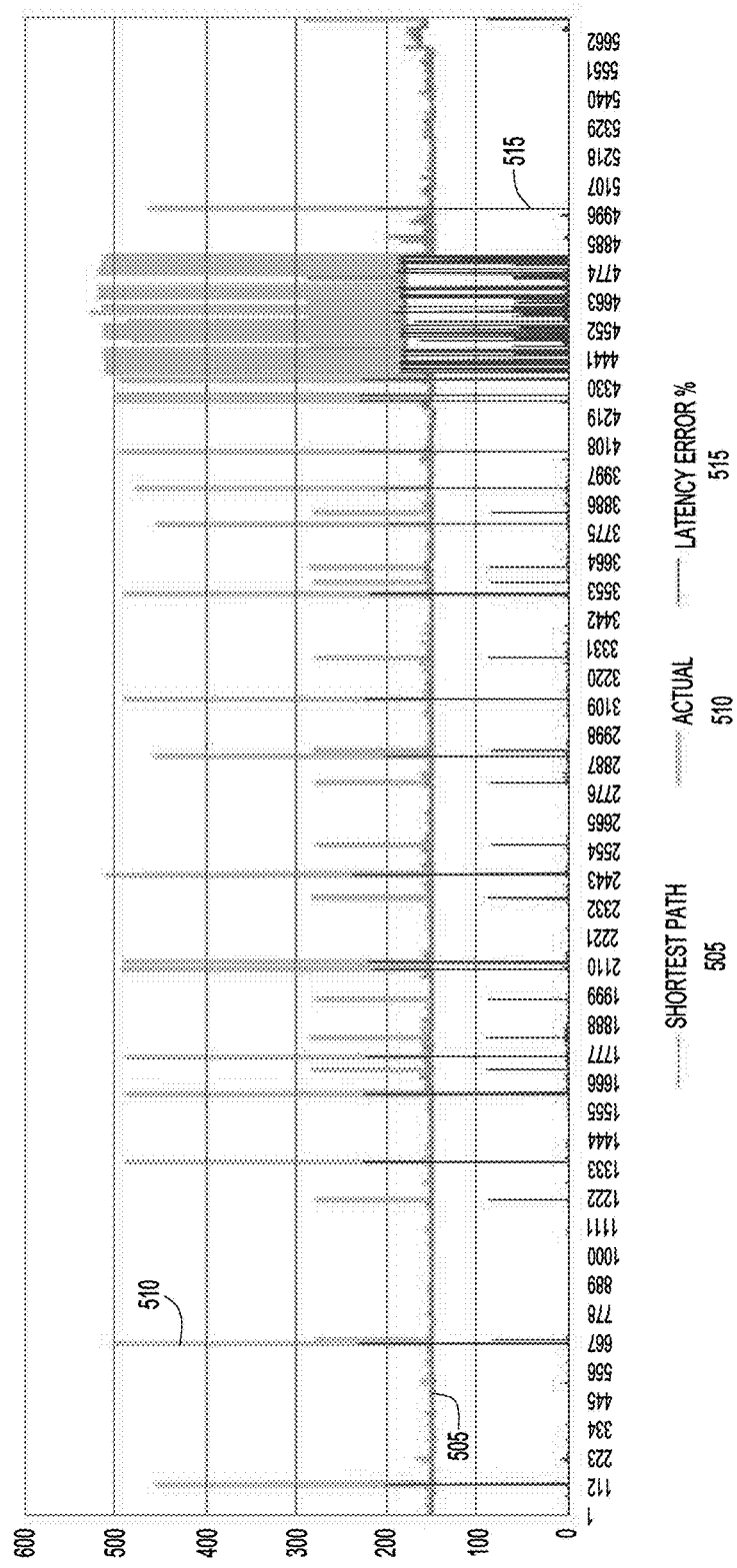
FIG. 5 illustrates a graph of test results for network path selection that used related art weight initialization techniques to optimize path latency.
Figure 6:
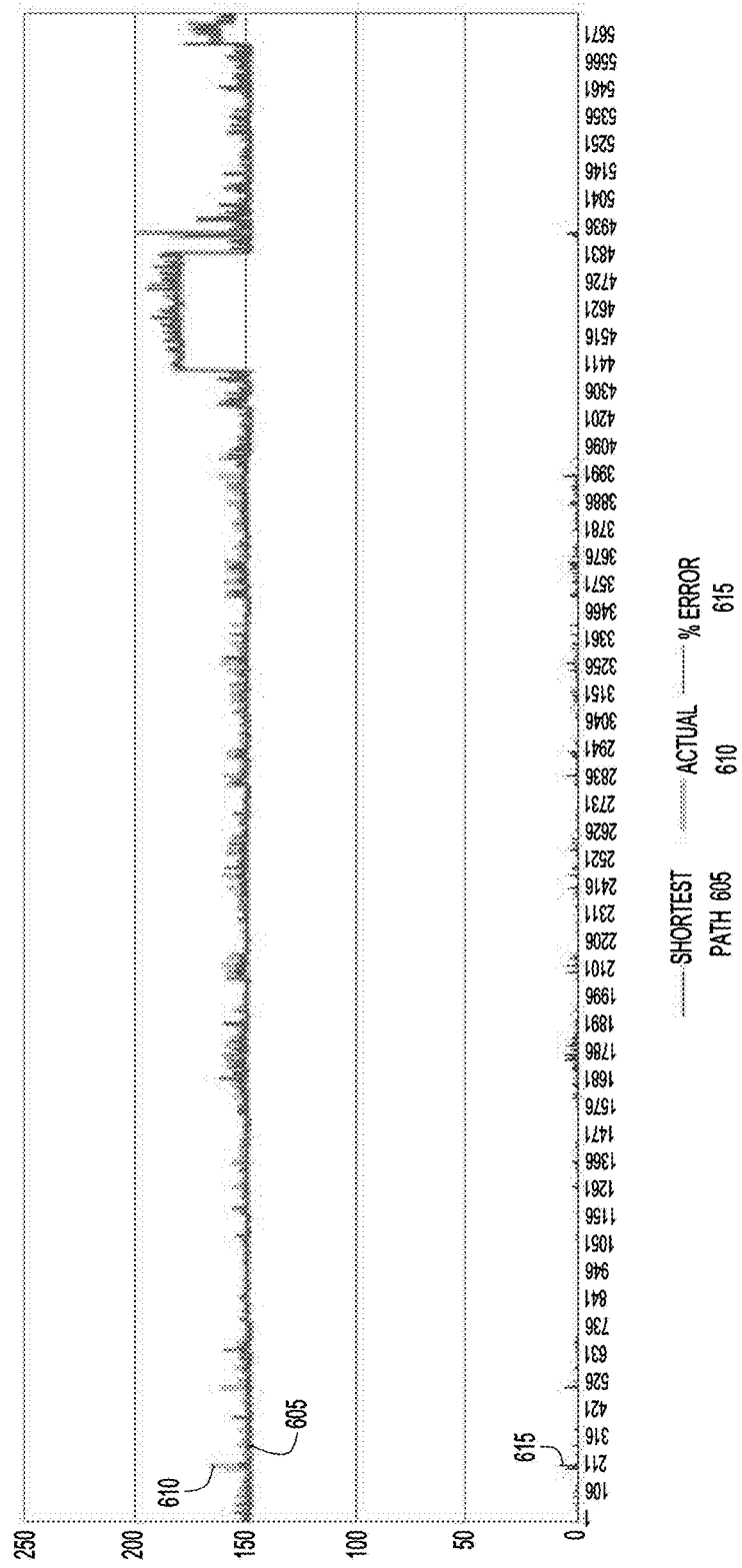
FIG. 6 illustrates a graph of test results for network path selection that used the weight initialization techniques of the present disclosure to optimize path patency, according to an example embodiment.

With reference now made to FIGS. 5 and 6, depicted therein are two graphs for the same network environment. FIG. 5 represents data indicating path selection performance using RNN techniques in the network environment in which the initial excitatory and inhibitory weights were randomly assigned. FIG. 6 represents data indicating path selection performance using RNN techniques in the network environment in which the initial excitatory and inhibitory weights were assigned using the techniques described herein. More specifically, both FIGS. 5 and 6 represent graphs of path latency versus time, as the graphs were created for tests which performed RNN modeling and Reinforcement Learning that sought to minimize path latency. The solid lines 505 and 605 in each graph, respectively, represent the actual least latency path through the network that could have been achieved. The shading 510 and 610 about the solid lines 505 and 605, respectively, represent the latency of the path actually selected. Finally, the shading on the x-axis, 515 and 615, respectively, represent the error between or difference between the selected path and the actual least latency path through the network. As can be seen in these two figures, networks were able to more successfully select a path closer to the actual least latency path when utilizing the techniques described herein.

Figure 7:
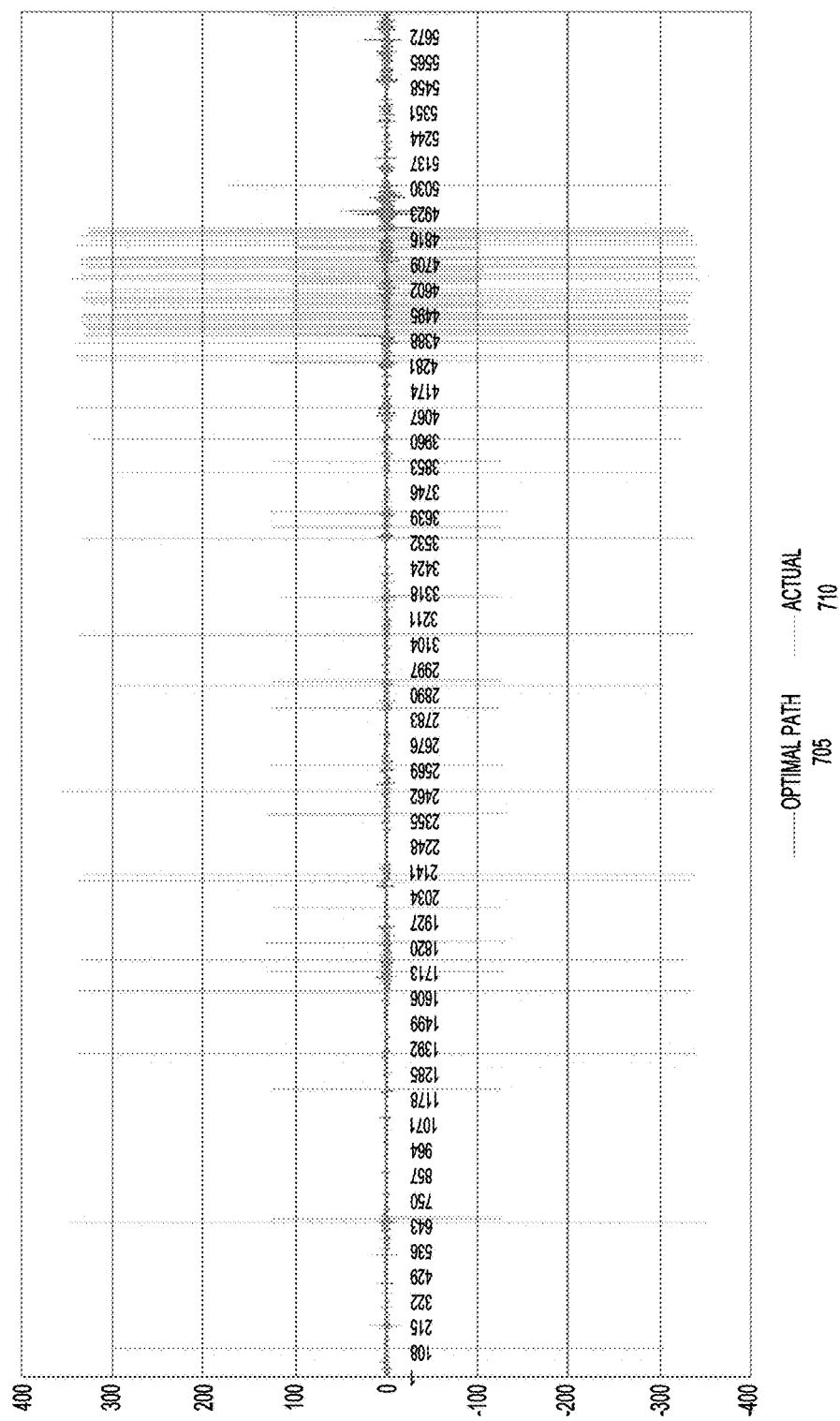
FIG. 7 illustrates a graph of test results for network path selection that used related art weight initialization techniques to optimize jitter.
Figure 8:
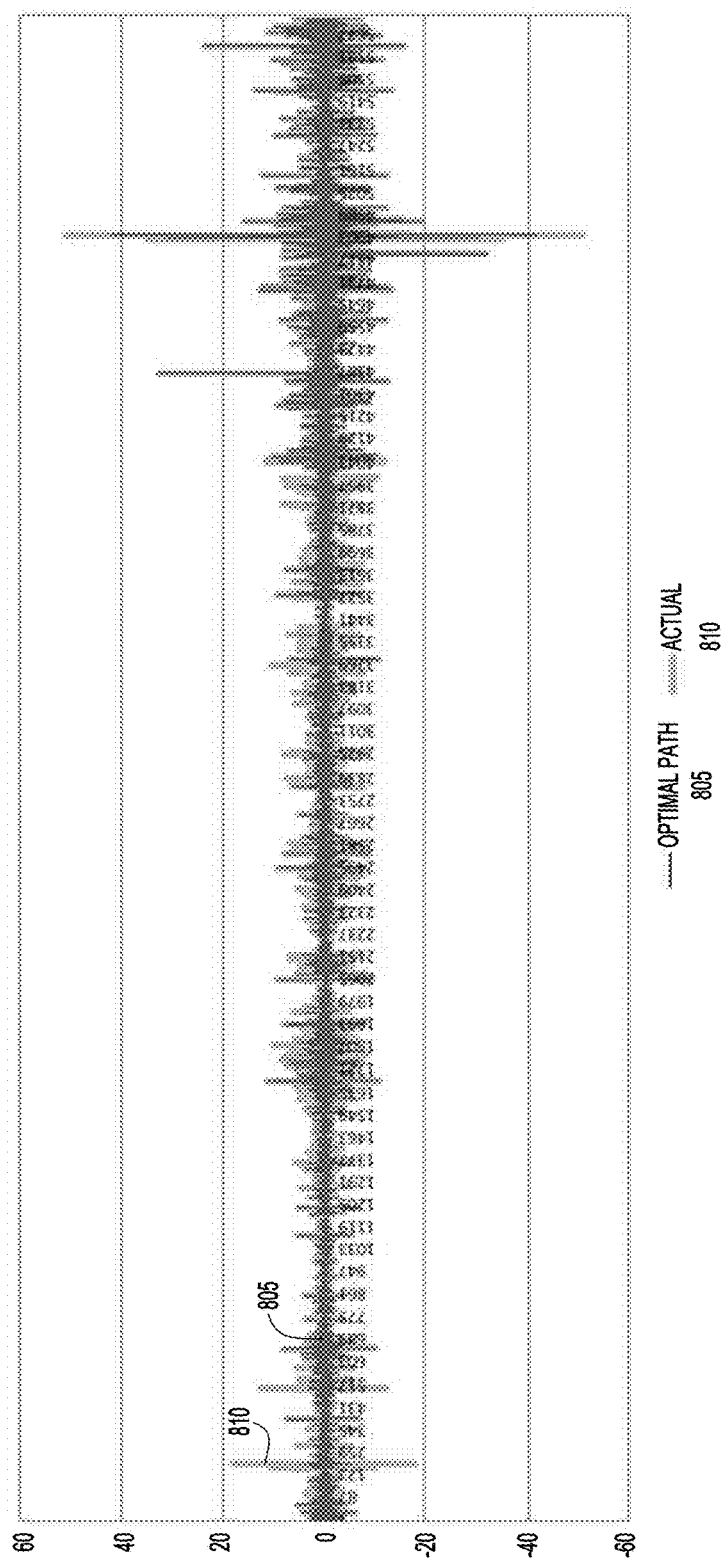
FIG. 8 illustrates a graph of test results for network path selection that used the weight initialization techniques of the present disclosure to optimize jitter, according to an example embodiment.

With reference now made to FIGS. 7 and 8, depicted therein are two graphs for the same network environment. FIG. 7 represents data indicating path selection performance using RNN techniques in the network environment in which the initial excitatory and inhibitory weights were randomly assigned. FIG. 8 represents data indicating path selection performance using RNN techniques in the network environment in which the initial excitatory and inhibitory weights were assigned using the techniques described herein. More specifically, both FIGS. 7 and 8 represent graphs of jitter versus time, as the graphs were created for tests which performed RNN modeling and Reinforcement Learning that sought to minimize jitter. The solid lines 705 and 805 in each graph, respectively, represent the jitter value for the actual lowest jitter path through the network that could have been achieved. The shading 710 and 810 about the solid lines 705 and 805, respectively, represent the jitter value of the path actually selected by the RNN. As can be seen in these two figures, networks were able to more successfully select a path closer to the actual lowest jitter path when utilizing the techniques described herein.

As illustrated through a comparison of FIGS. 5 and 6 and FIGS. 7 and 8, respectively, implementation of the techniques described herein provides a real and measurable improvement to the functioning of a computer network. As shown in FIGS. 5-8, the techniques described herein result in a network that more accurately sends packets over the optimal path, which results in network performances gains. When the techniques described herein are applied to shortest path length, packet loss rate, and other network parameters, similar measurable performance gains are achieved. Improving network performance is a fundamental technical problem faced in the technical field of computer networking. The techniques described herein provide a particular improvement addressing this technical problem.

Figure 9:
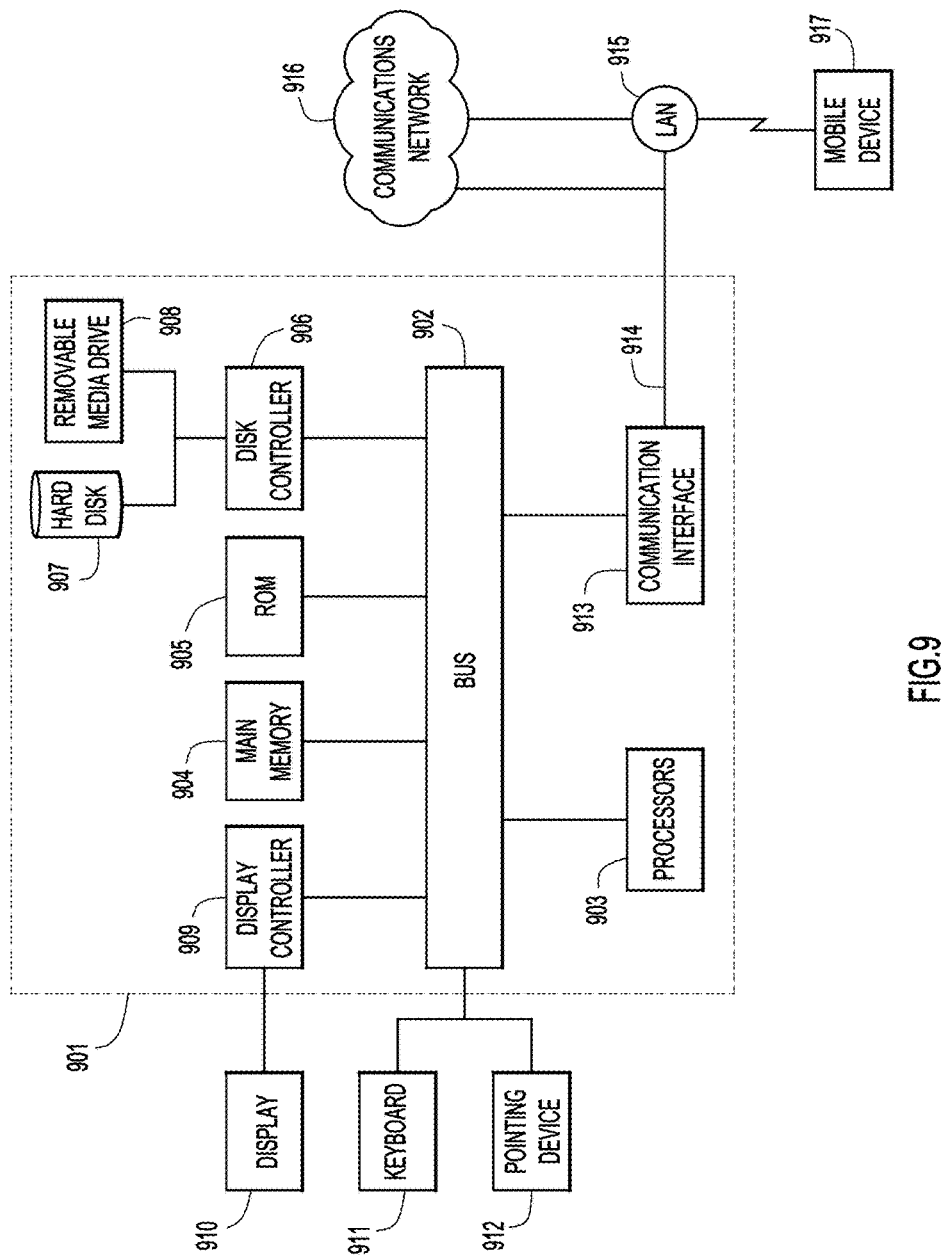
FIG. 9 illustrates a block diagram of a network device configured to provide weight initialization for use with Random Neural Network modeling and Reinforcement Learning, according to an example embodiment.

With reference now made to FIG. 9, illustrated therein is a computer system 901 upon which the embodiments presented may be implemented. The computer system 901 may be programmed to implement a computer based device, such as a network controller, network connected device, or physical network edge device described above with reference to FIGS. 1-4. The computer system 901 includes a bus 902 or other communication mechanism for communicating information, and a processor 903 coupled with the bus 902 for processing the information. While the figure shows a single block 903 for a processor, it should be understood that the processors 903 represent a plurality of processing cores, each of which can perform separate processing. The computer system 901 also includes a main memory 904, such as a random access memory (RAM) or other dynamic storage device (e.g., dynamic RAM (DRAM), static RAM (SRAM), and synchronous DRAM (SD RAM)), coupled to the bus 902 for storing information and instructions to be executed by processor 903. In addition, the main memory 904 may be used for storing temporary variables or other intermediate information during the execution of instructions by the processor 903.

The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 901 may also include a display controller 909 coupled to the bus 902 to control a display 910, such as a cathode ray tube (CRT), Liquid Crystal Display (LCD) or other now known or hereinafter developed display technologies, for displaying information to a computer user. The computer system 901 may include input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of data stored and/or generated by the computer system 901.

The computer system 901 performs a portion or all of the processing steps of the process in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 901, for driving a device or devices for implementing the process, and for enabling the computer system 901 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a wired or wireless network interface card to attach to any packet switched (wired or wireless) LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local area network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 901 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

In summary, presented herein are a method, apparatus, and computer readable storage media encoded with instructions configured to perform a process for weight initialization of Random Neural Networks with Reinforcement Learning that guarantees that the initial excitatory weights are directly proportional to the neuron's initial reward, whereas the initial inhibitory weights are inversely proportional to the initial reward, while satisfying the constraints of convergence of the system of non-linear equations governing the potentials of the neurons in the neural network. These techniques provide for path selection with improved accuracy, show a decrease in incorrect change predictions, and an increase in correct change predictions.

Accordingly, in one form, the techniques described herein are provided as a method comprising: determining a plurality of paths through a network for transmitting a packet from a source network connected device to a destination network connected device; modelling the plurality of paths as a plurality of nodes in a Random Neural Network, wherein each of the plurality of nodes corresponds to one of the plurality of paths and a reward is calculated for each of the nodes of the plurality of nodes; determining an excitatory weight and an inhibitory weight for each of the plurality of nodes in the Random Neural Network, wherein determining the excitatory weight comprises setting an excitatory weight directly proportional to the reward corresponding to the node of the plurality of nodes for which the excitatory weight is being determined, and wherein determining the inhibitory weight comprises setting the inhibitory weight inversely proportional to the reward corresponding to the node of the plurality of nodes for which the inhibitory weight is being determined; determining a potential for each of the plurality of nodes based upon the excitatory weights and the inhibitory weights for the plurality of nodes; selecting a path of the plurality of paths corresponding to the node with a highest potential; and transmitting the packet from the source network connected device to the destination network connected device over the path of the plurality of paths corresponding to the node with the highest potential.

In another form, an apparatus is provided comprising: a network interface configured to communicate over a network; and one or more processors, wherein the one or more processors are configured to: determine a plurality of paths through the network for transmitting a packet from a source network connected device to a destination network connected device; model the plurality of paths as a plurality of nodes in a Random Neural Network, wherein each of the plurality of nodes corresponds to one of the plurality of paths and a reward is calculated for each of the nodes of the plurality of nodes; determine an excitatory weight and an inhibitory weight for each of the plurality of nodes in the Random Neural Network, wherein determining the excitatory weight comprises setting an excitatory weight directly proportional to the reward corresponding to the node of the plurality of nodes for which the excitatory weight is being determined, and wherein determining the inhibitory weight comprises setting the inhibitory weight inversely proportional to the reward corresponding to the node of the plurality of nodes for which the inhibitory weight is being determined; determine a potential for each of the plurality of nodes based upon the excitatory weights and the inhibitory weights for the plurality of nodes; selecting a path of the plurality of paths corresponding to the node with a highest potential; and transmit, via the network interface, the packet from the source network connected device to the destination network connected device over the path of the plurality of paths corresponding to the node with the highest potential.

In still another form, a tangible, non-transitory computer readable storage medium encoded with instructions is provided. The instructions, when executed, are operable or cause one or more processors to: determine a plurality of paths through a network for transmitting a packet from a source network connected device to a destination network connected device; model the plurality of paths as a plurality of nodes in a Random Neural Network, wherein each of the plurality of nodes corresponds to one of the plurality of paths and a reward is calculated for each of the nodes of the plurality of nodes; determine an excitatory weight and an inhibitory weight for each of the plurality of nodes in the Random Neural Network, wherein determining the excitatory weight comprises setting an excitatory weight directly proportional to the reward corresponding to the node of the plurality of nodes for which the excitatory weight is being determined, and wherein determining the inhibitory weight comprises setting the inhibitory weight inversely proportional to the reward corresponding to the node of the plurality of nodes for which the inhibitory weight is being determined; determine a potential for each of the plurality of nodes based upon the excitatory weights and the inhibitory weights for the plurality of nodes; select a path of the plurality of paths corresponding to the node with a highest potential; and transmit the packet from the source network connected device to the destination network connected device over the path of the plurality of paths corresponding to the node with the highest potential.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining a plurality of paths from a source network connected device to a destination network connected device through a network for transmitting a packet from the source network connected device to the destination network connected device;
   modeling the plurality of paths as a plurality of nodes in a Random Neural Network, wherein each of the plurality of nodes corresponds to one of the plurality of paths;
   calculating a reward for each of the plurality of nodes;
   determining an excitatory weight and an inhibitory weight for each of the plurality of nodes in the Random Neural Network, wherein determining the excitatory weight comprises setting the excitatory weight for a node of the plurality of nodes for which the excitatory weight is being determined directly proportional to the reward corresponding to the node of the plurality of nodes for which the excitatory weight is being determined, and wherein determining the inhibitory weight comprises setting the inhibitory weight for a node of the plurality of nodes for which the inhibitory weight is being determined inversely proportional to the reward corresponding to the node of the plurality of nodes for which the inhibitory weight is being determined;

determining a potential for each of the plurality of nodes based upon the excitatory weights and the inhibitory weights for the plurality of nodes;

selecting a path of the plurality of paths corresponding to the node with a highest potential; and transmitting the packet from the source network connected device to the destination network connected device over the path of the plurality of paths corresponding to the node with the highest potential.

2. The method of claim 1, further comprising updating the excitatory weights and the inhibitory weights of the node with the highest potential in response to the transmission of the packet from the source network connected device to the destination network connected device over the path of the plurality of paths corresponding to the node with the highest potential.

3. The method of claim 2, further comprising:
determining a second potential for each of the plurality of nodes based upon the excitatory weights and the inhibitory weights for the plurality of nodes after the updating the excitatory weights and the inhibitory weights;

selecting a path of the plurality of paths corresponding to the node with the highest second potential for transmission of a second packet from the source network connected device to the destination network connected device; and transmitting the second packet from the source network connected device to the destination network connected device over the path of the plurality of paths corresponding to the node with the highest second potential.

4. The method of claim 1, wherein calculating the reward comprises calculating the reward based upon a network parameter for the path corresponding to the node for which the reward is being calculated.

5. The method of claim 4, wherein the network parameter comprises at least one of latency, jitter, a packet loss ratio, bandwidth or a path length.

6. The method of claim 1, wherein the excitatory weight comprises an initial excitatory weight and the inhibitory weight comprises an initial inhibitory weight.

7. The method of claim 1, wherein determining the inhibitory weight for each of the plurality of nodes in the Random Neural Network comprises determining the inhibitory weight for each of the plurality of nodes such that a sum of the inhibitory weights does not equal to zero.

8. An apparatus comprising:
a network interface configured to communicate over a network; and
one or more processors, wherein the one or more processors are configured to:
determine a plurality of paths from a source network connected device to a destination network connected device through the network for transmitting a packet from the source network connected device to the destination network connected device;
model the plurality of paths as a plurality of nodes in a Random Neural Network, wherein each of the plurality of nodes corresponds to one of the plurality of paths;
calculate a reward for each of the plurality of nodes;
determine an excitatory weight and an inhibitory weight for each of the plurality of nodes in the Random Neural Network, wherein determining the excitatory weight comprises setting the excitatory weight for a node of the plurality of nodes for which the excitatory weight is being determined directly proportional to the reward corresponding to the node of the plurality of nodes for which the excitatory weight is being determined, and wherein determining the inhibitory weight comprises setting the inhibitory weight for a node of the plurality of nodes for which the inhibitory weight is being determined inversely proportional to the reward corresponding to the node of the plurality of nodes for which the inhibitory weight is being determined;
determine a potential for each of the plurality of nodes based upon the excitatory weights and the inhibitory weights for the plurality of nodes;
selecting a path of the plurality of paths corresponding to the node with a highest potential; and
transmit, via the network interface, the packet from the source network connected device to the destination network connected device over the path of the plurality of paths corresponding to the node with the highest potential.

9. The apparatus of claim 8, wherein the one or more processors are further configured to update the excitatory weights and the inhibitory weights of the node with the highest potential in response to the transmission of the packet from the source network connected device to the destination network connected device over the path of the plurality of paths corresponding to the node with the highest potential.

10. The apparatus of claim 9, wherein the one or more processors are further configured to:
determine a second potential for each of the plurality of nodes based upon the excitatory weights and the inhibitory weights for the plurality of nodes after the updating the excitatory weights and the inhibitory weights;
select a path of the plurality of paths corresponding to the node with the highest second potential for transmission of a second packet from the source network connected device to the destination network connected device; and
transmit the second packet from the source network connected device to the destination network connected device over the path of the plurality of paths corresponding to the node with the highest second potential.

11. The apparatus of claim 8, wherein the one or more processors are configured to calculate the reward by calculating the reward based upon a network parameter for the path corresponding to the node for which the reward is being calculated.

12. The apparatus of claim 11, wherein the network parameter comprises at least one of latency, jitter, a packet loss ratio, bandwidth or a path length.

13. The apparatus of claim 8, wherein the excitatory weight comprises an initial excitatory weight and the inhibitory weight comprises an initial inhibitory weight.

14. The apparatus of claim 8, wherein the one or more processors are configured to determine the inhibitory weight for each of the plurality of nodes in the Random Neural Network by determining the inhibitory weight for each of the plurality of nodes such that a sum of the inhibitory weights does not equal to zero.

15. A non-transitory computer readable storage medium encoded with instructions, wherein the instructions, when executed, are operable to:
 determine a plurality of paths from a source network connected device to a destination network connected device through a network for transmitting a packet from the source network connected device to the destination network connected device;
 model the plurality of paths as a plurality of nodes in a Random Neural Network, wherein each of the plurality of nodes corresponds to one of the plurality of paths;
 calculate a reward for each of the nodes of the plurality of nodes;
 determine an excitatory weight and an inhibitory weight for each of the plurality of nodes in the Random Neural Network, wherein determining the excitatory weight comprises setting the excitatory weight for a node of the plurality of nodes for which the excitatory weight is being determined directly proportional to the reward corresponding to the node of the plurality of nodes for which the excitatory weight is being determined, and wherein determining the inhibitory weight comprises setting the inhibitory weight for a node of the plurality of nodes for which the inhibitory weight is being determined inversely proportional to the reward corresponding to the node of the plurality of nodes for which the inhibitory weight is being determined;
 determine a potential for each of the plurality of nodes based upon the excitatory weights and the inhibitory weights for the plurality of nodes;
 select a path of the plurality of paths corresponding to the node with a highest potential; and
 transmit the packet from the source network connected device to the destination network connected device over the path of the plurality of paths corresponding to the node with the highest potential.

16. The non-transitory computer readable storage medium of claim 15, further comprising instructions, when executed, operable to update the excitatory weights and the inhibitory weights of the node with the highest potential in response to the transmission of the packet from the source network connected device to the destination network connected device over the path of the plurality of paths corresponding to the node with the highest potential.

17. The non-transitory computer readable storage medium of claim 16, further comprising instructions, when executed, operable to:
 determine a second potential for each of the plurality of nodes based upon the excitatory weights and the inhibitory weights for the plurality of nodes after the updating the excitatory weights and the inhibitory weights;
 select a path of the plurality of paths corresponding to the node with the highest second potential for transmission of a second packet from the source network connected device to the destination network connected device; and
 transmit the second packet from the source network connected device to the destination network connected device over the path of the plurality of paths corresponding to the node with the highest second potential.

18. The non-transitory computer readable storage medium of claim 15, wherein the instructions operable to calculate the reward are operable to calculate the reward based upon a network parameter for the path corresponding to the node for which the reward is being calculated.

19. The non-transitory computer readable storage medium of claim 18, wherein the network parameter comprises at least one of latency, jitter, a packet loss ratio, bandwidth or a path length.

20. The non-transitory computer readable storage medium of claim 15, wherein the instructions operable to determine the inhibitory weight for each of the plurality of nodes in the Random Neural Network are operable to determine the inhibitory weight for each of the plurality of nodes such that a sum of the inhibitory weights does not equal to zero.

* * * * *